UNITED STATES PATENT OFFICE.

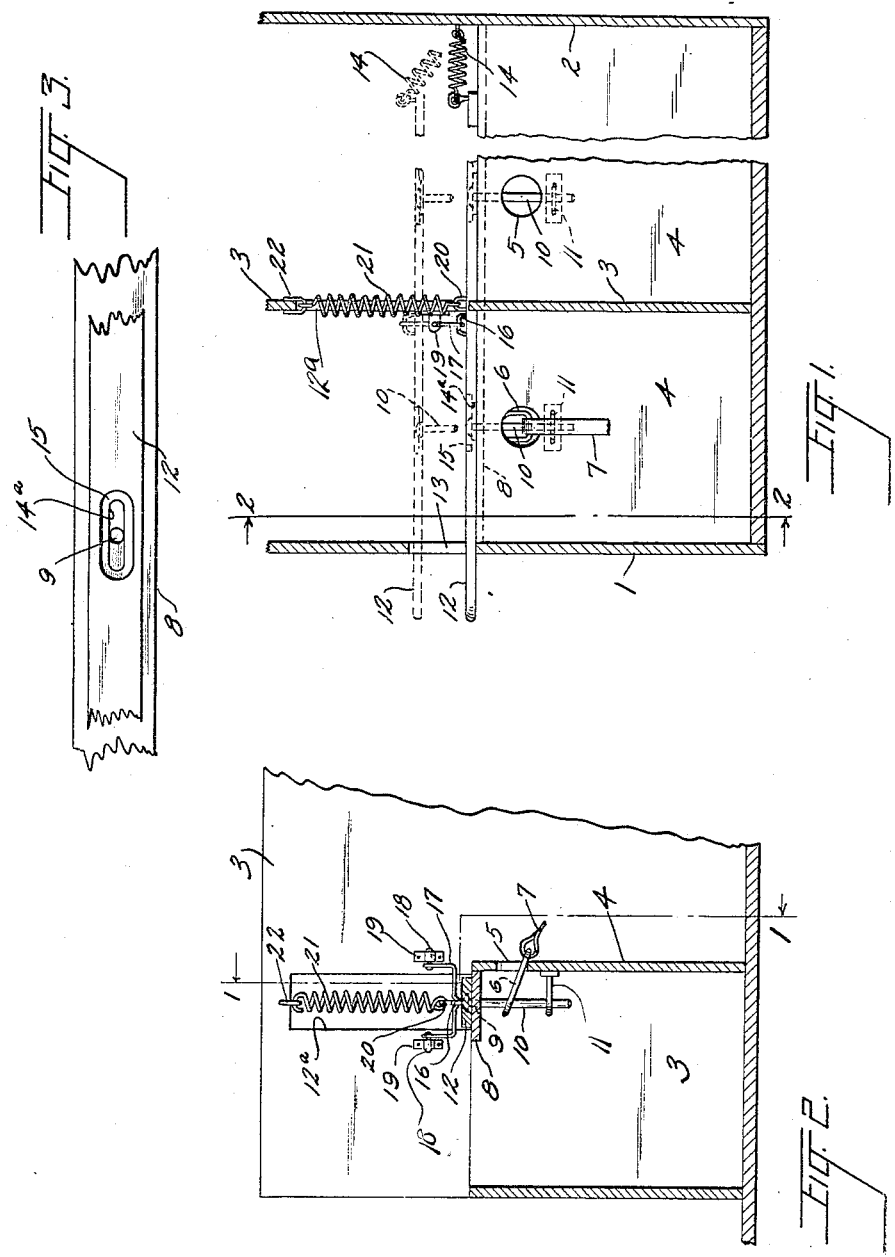

JOHN CHRISTOFFEL, OF EDMONTON, ALBERTA, CANADA.

ANIMAL-RELEASING DEVICE.

1,294,400. Specification of Letters Patent. Patented Feb. 18, 1919.

Application filed March 13, 1918. Serial No. 222,230.

*To all whom it may concern:*

Be it known that I, JOHN CHRISTOFFEL, a citizen of Switzerland, residing at Edmonton, in the Province of Alberta, in the Dominion of Canada, have invented certain new and useful Improvements in Animal-Releasing Devices, of which the following is a specification.

This invention relates to improvements in animal releasing devices and its object is to provide means whereby a number of animals may be confined in a series of stalls and simultaneously released in case of necessity. A further object is to provide a simple and practical device of the kind that is cheap to manufacture. With the foregoing and other objects in view the invention consists in the combination and arrangement of parts to be hereinafter fully described, pointed out in the appended claims and illustrated in the accompanying drawing which forms a part of this specification and in which—

Figure 1 is a vertical sectional view taken on line 1—1 of Fig. 2.

Fig. 2 is a similar view on line 2—2 of Fig. 1.

Fig. 3 is an enlarged fragmentary view of the pull rod and its support.

Like reference characters denote corresponding parts throughout the several views.

The reference numeral 1 denotes the front wall of a stable, 2 the rear wall and 3 denotes one of the stall partitions which partitions divide the stable into the stalls. The manger wall 4 in each stall is formed with a perforation 5 through which the hitching ring 6 extends that carries the halter strap 7 to which an animal is hitched. To the top edge of the wall 4 I secure a shelf 8 that extends through the several stalls and that in each stall is formed with a perforation 9 through which a bolt 10 extends, said bolt extending through a guide bracket 11 secured to the wall 4 and carrying a hitching ring 6. Slidably disposed upon the shelf 8 is the pull rod 12 that extends through openings 12ª in the several stalls and out through a perforation 13 formed in the stable wall 1, said pull rod being secured by a stout spring 14 to the rear stable wall 2 to yieldingly retain the pull rod in a predetermined position.

The pull rod 12 is formed, in each stall, with an elongated slot 14ª into which the bolt 10 extends and with a groove 15, the head of said bolt being held fast by said pull rod.

Secured to the pull rod 12 in each stall is a staple 16 which is engaged by a U-shaped lever 17 the ends of which are engaged by pins 18 journaled in brackets 19 secured to the wall 3 upon opposite sides of the opening 12ª in that wall. In the normal position of the pull rod the staple 16, lever 17 and brackets 19 all lie in the same vertical plane. Another staple 20 also secured to the pull rod in each opening 12ª in the wall 3 is connected by a contractile spring 21 to a bracket 22 secured to the wall 3 at the upper end of the said opening 12ª. When it is desired to release all of the animals at a time the operator from outside the stable grasps the pull rod 12 by its free end and pulls it toward him or away from the wall 2 thus moving the staples 16 and levers 17 out of the vertical plane of the brackets 19. The springs 21 will now raise the pull rod from the position shown in full lines, Fig. 1, to the position shown dotted, thus raising the several bolts 10 and releasing the several hitching rings. One animal at a time is released in the ordinary manner by releasing his halter strap 7. To reset the device the pull rod is manually depressed into its original position and when the staples 16, levers 17 and brackets 19 are in a common vertical plane the spring 14 will hold them against accidental displacement.

What is claimed is:—

1. In an animal releasing device, a shelf formed with a plurality of perforations, a slotted pull rod formed with a plurality of enlongated grooves, bolts carried by said pull rod and disposed in the perforated portion of the same and of said shelf, the heads of said bolts being disposed in the elongated grooves of said pull rod, brackets, staples carried by said pull rod, U-shaped levers journaled in said brackets and connected to said staples, said brackets, levers and staples being disposed in a common vertical plane in the normal position of said pull rod, said staples and levers being capable of movement about said brackets as a center when said pull rod is moved out of its normal position, lift springs for said pull rod, and means for yieldingly retaining said pull rod in a predetermined or normal position.

2. In an animal releasing device, a horizontally disposed shelf formed with a plurality of perforations, a slotted pull rod normally disposed flat upon said shelf and movable horizontally and vertically and formed with a plurality of elongated grooves, bolts carried by said pull rod and disposed in the perforated portion of the same and of said shelf, the heads of said bolts being disposed in the elongated grooves of said pull rod, alined brackets, staples carried by said pull rod, U-shaped levers having their ends journaled in the said alined brackets, said levers being connected to said staples, said brackets, levers and staples being disposed in a common vertical plane in the normal position of said pull rod, said staples and levers being capable of movement about said brackets as a center when said pull rod is moved out of its normal position, lift springs for said pull rod, and means for yieldingly retaining said pull rod in a predetermined or normal position.

In testimony that I claim the foregoing as my own I have hereto affixed my signature in the presence of two subscribing witnesses.

JOHN CHRISTOFFEL.

Witnesses:
 CHARLES DEMARTINI,
 PIERRE YUCHLI.

Copies of this patent may be obtained for five cents each, by addressing the "Commissioner of Patents, Washington, D. C."